US011089656B2

(12) United States Patent
Xiao

(10) Patent No.: US 11,089,656 B2
(45) Date of Patent: *Aug. 10, 2021

(54) INTELLIGENT TEMPERATURE ADJUSTMENT CONTROL CIRCUIT OF ELECTRONIC CIGARETTE

(71) Applicant: Shenzhen Uwell Technology Co., Ltd., Shenzhen (CN)

(72) Inventor: Yucheng Xiao, Shenzhen (CN)

(73) Assignee: SHENZHEN LAVELE TECHNOLOGY CO., LTD., Shenzhen (CN)

( * ) Notice: Subject to any disclaimer, the term of this patent is extended or adjusted under 35 U.S.C. 154(b) by 402 days.

This patent is subject to a terminal disclaimer.

(21) Appl. No.: 16/186,592

(22) Filed: Nov. 12, 2018

(65) Prior Publication Data

US 2019/0075850 A1  Mar. 14, 2019

Related U.S. Application Data

(63) Continuation of application No. PCT/CN2017/103274, filed on Sep. 25, 2017.

(30) Foreign Application Priority Data

Jun. 16, 2017  (CN) .......................... 201720707912.1

(51) Int. Cl.
*H05B 1/02*  (2006.01)
*G05D 23/30*  (2006.01)
(Continued)

(52) U.S. Cl.
CPC .......... *H05B 1/0244* (2013.01); *A24F 40/50* (2020.01); *G05D 23/30* (2013.01); *H02J 7/00* (2013.01);
(Continued)

(58) Field of Classification Search
CPC .......... A24F 47/008; G05D 23/30; H02J 7/00; H05B 1/0244; H05B 1/0277; H05B 1/0297
(Continued)

(56) References Cited

U.S. PATENT DOCUMENTS 3,176,117 A * 3/1965 Knoll .................... F24H 3/0411
                                                          392/360
5,795,664 A * 8/1998 Kelly .................. H01M 10/657
                                                          429/7
(Continued)

FOREIGN PATENT DOCUMENTS

CN    204205561 U    3/2015
CN    104571190 A    4/2015
CN    205728051 U    11/2016

OTHER PUBLICATIONS

International Search Report for PCT CN2017/103274.
Written Opinion of the international Searching Authority for PCT/CN2017/103274.

*Primary Examiner* — Harshad C Patel

(57) ABSTRACT

An intelligent temperature adjustment control circuit includes a first, resistance sampling circuit, a second resistance sampling circuit, a current sampling circuit, a voltage sampling circuit and a thermocouple sensor, respectively connected to a heating wire. The thermocouple sensor is connected in turn with an analog-to-digital converter and a signal isolation driving circuit to collect real-time temperature data of the heating wire and then transmit it to a main control unit after being processed. The main control unit is configured to determine the received initial resistance value, the real-time resistance value, the real-time current value, the real-time voltage value and the voltage digital signal, and then send a control signal to a main driving circuit according to a judgment result of the received initial resistance value,
(Continued)

the real-time resistance value, the real-time current value, the real-time voltage value and the voltage digital signal, that have been determined.

4 Claims, 5 Drawing Sheets

(51) Int. Cl.
    *H02J 7/00*          (2006.01)
    *A24F 40/50*       (2020.01)

(52) U.S. Cl.
    CPC ........ H05B 1/0297 (2013.01); *H02J 2207/20* (2020.01)

(58) Field of Classification Search
    USPC ......................................................... 131/329
    See application file for complete search history.

(56) References Cited

U.S. PATENT DOCUMENTS

| | | | |
|---|---|---|---|
| 2010/0242974 A1* | 9/2010 | Pan | A24F 40/51 131/273 |
| 2015/0173124 A1* | 6/2015 | Qiu | G06F 13/387 131/328 |
| 2016/0329607 A1* | 11/2016 | Miyao | H02J 7/00 |
| 2016/0367925 A1* | 12/2016 | Blackley | B01D 37/00 |
| 2017/0046738 A1* | 2/2017 | Cameron | A24F 47/008 |
| 2017/0127726 A1* | 5/2017 | Xiang | A24F 40/60 |
| 2017/0215484 A1* | 8/2017 | Xiang | A24F 40/90 |
| 2018/0043114 A1* | 2/2018 | Bowen | A61M 15/003 |
| 2018/0332895 A1* | 11/2018 | Li | A24F 40/50 |
| 2019/0021137 A1* | 1/2019 | Qiu | H05B 1/0244 |

* cited by examiner ered by the power management circuit. The power adjusting unit is connected to the main driving circuit and the heating wire, and is configured to adjust an operating power of the heating wire.

INTELLIGENT TEMPERATURE ADJUSTMENT CONTROL CIRCUIT OF ELECTRONIC CIGARETTE

CROSS-REFERENCE TO RELATED APPLICATION

The present application is a continuation-application of International Application PCT/CN2017/103274, with an international filing date of Sep. 25, 2017, which claims foreign priority of Chinese Patent Application No. 2017207079121, filed on Jun. 16, 2017 in the State Intellectual Property Office of China, the contents of all of which are hereby incorporated by reference the contents of all of which are hereby incorporated by reference.

BACKGROUND

1. Technical Field

The present disclosure generally relates to electronic, cigarettes field, and especially relates to an intelligent temperature adjustment control circuit of an electronic cigarette.

2. Description of Related Art

With the development of society, people are paying more attention to their health so that smokers are gradually decreasing. As a substitute for cigarettes, electronic cigarettes are rapidly becoming more popular in the market. In order to prevent an atomizer used on an electronic cigarette from being damaged by excessive heating, a temperature adjustment control circuit is provided in some kinds of conventional electronic cigarettes. However, in such circuit, the temperature of a heating wire of the atomizer is estimated only by collecting the resistance value and the current value of the circuit, thereby the error rate of the calculation result is higher and the control precision is also lower.

SUMMARY

The technical problems to be solved: in view of the shortcomings of the related art, the present disclosure relates to an intelligent temperature adjustment control circuit of an electronic cigarette which can directly detect the real-time temperature of a heating wire of an atomizer used on the electronic cigarette to obtain high and more accurate control accuracy.

The technical solution adopted for solving technical problems of the present disclosure is:

an intelligent temperature adjustment control circuit of an electronic cigarette includes a first resistance sampling circuit connected to a heating wire of an atomizer used on the electronic cigarette and configured to collect an initial resistance value of the heating wire; a second resistance sampling circuit connected to the heating wire of the atomizer and configured to collect a real-time resistance value of the heating wire in a heated state; a current sampling circuit connected to the heating wire of the atomizer and configured to collect a real-time current value passing through the heating wire in the heated state; a voltage sampling circuit connected to the heating wire of the atomizer and configured to collect a real-time voltage value passing through the heating wire in the heated state; a thermocouple sensor connected to the heating wire of the atomizer and configured to collect real-time temperature data of the heating wire in the heated state and convert it to a corresponding voltage signal value; an analog-to-digital converter connected to the thermocouple sensor and configured to convert the voltage signal value to a voltage digital signal; a signal isolation driving circuit connected to the analog-to-digital converter and comprising at least one optocoupler for transmitting the voltage digital signal to a main control unit via a photoelectric coupling transmission way. The main control unit is connected to each of the first resistance sampling unit, the second resistance sampling unit, the current sampling circuit, the voltage sampling circuit and the signal isolation driving circuit, and configured to determine the received initial resistance value, the real-time resistance value, the real-time current value, the real-time voltage value and the voltage digital signal, and then send a control signal to a main driving circuit according to a judgment result of the received initial resistance value, the real-time resistance value, the real-time current value, the real-time voltage value and the voltage digital signal, that have been determined. The main driving circuit is connected to the main control unit and configured to drive a power adjusting unit according to the received control signal. The power adjusting unit is connected to each of the main driving circuit and the heating wire and configured to adjust an operating power of the heating wire according to a driving signal transmitted from the main driving circuit.

Wherein the intelligent temperature adjustment control circuit further includes a power management circuit and a battery connected to the power management circuit, the main control unit and the power adjusting unit respectively; the power management circuit connected to a boost circuit and applying a working voltage for the boost circuit. The intelligent temperature adjustment control circuit further includes a power management circuit and a battery connected to each of the power management circuit, the main control unit and the power adjusting unit. The power management circuit is connected to a boost circuit and applying a working voltage for the boost circuit; and the power rectifying and filtering circuit is connected to the analog-to-digital converter and the signal isolation driving circuit, respectively and configured to rectify and filter the boosted working voltage and then transmit it to the analog-to-digital converter and the signal isolation driving circuit.

Wherein the battery is further connected to an anti-reverse protecting circuit and the power management circuit includes a charging circuit with a USB socket formed therein.

Wherein the main control unit is connected to both a controlling switch and a displaying screen.

The present disclosure provides the advantages as below.

The structure of the present disclosure can directly detect the real-time temperature of the heating wire of the atomizer, so its control accuracy is more precise.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
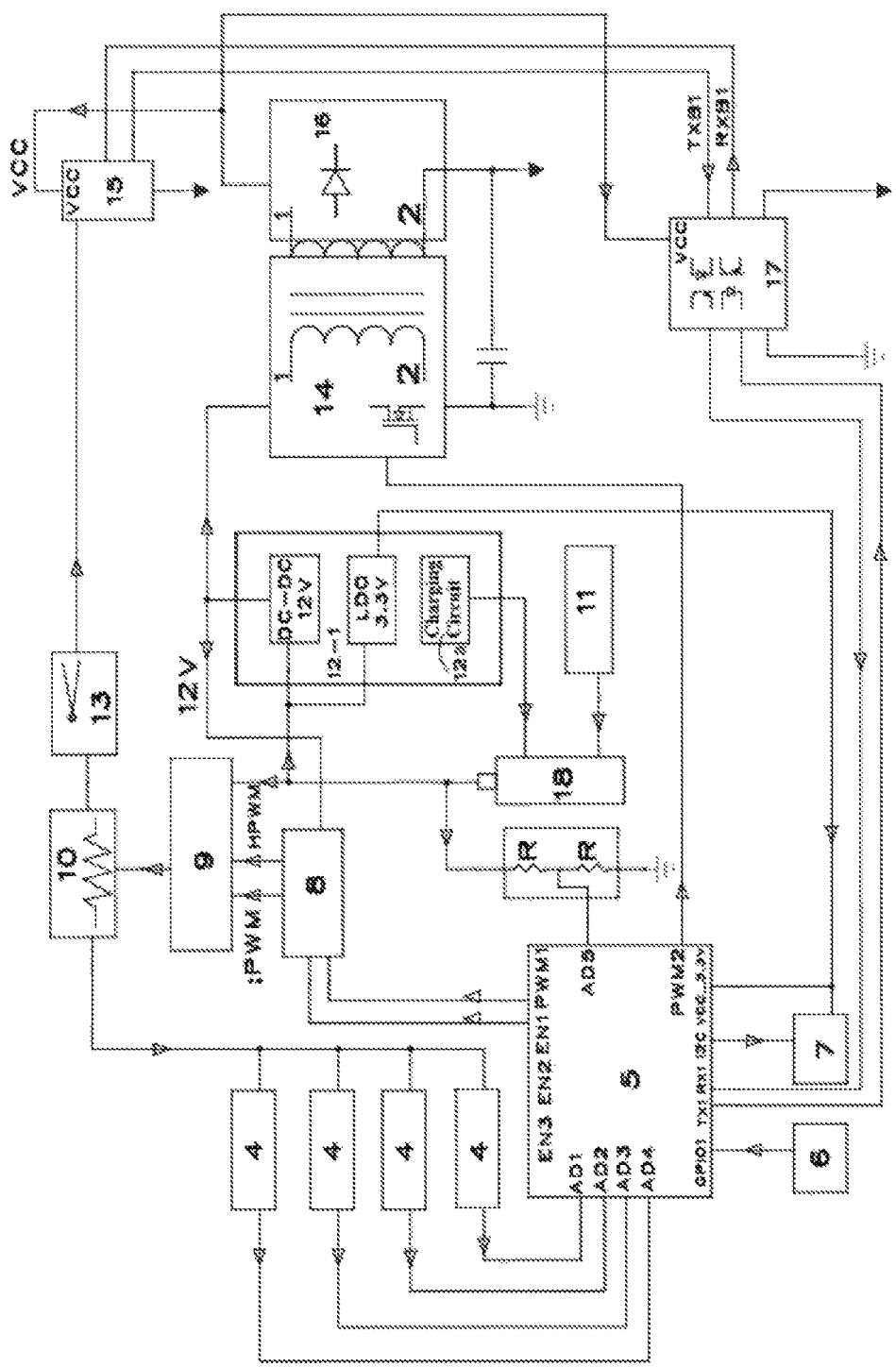
FIG. 1 is a schematic circuit diagram of the intelligent temperature adjustment control circuit of an electronic cigarette in accordance with an exemplary embodiment.
Figure 2:
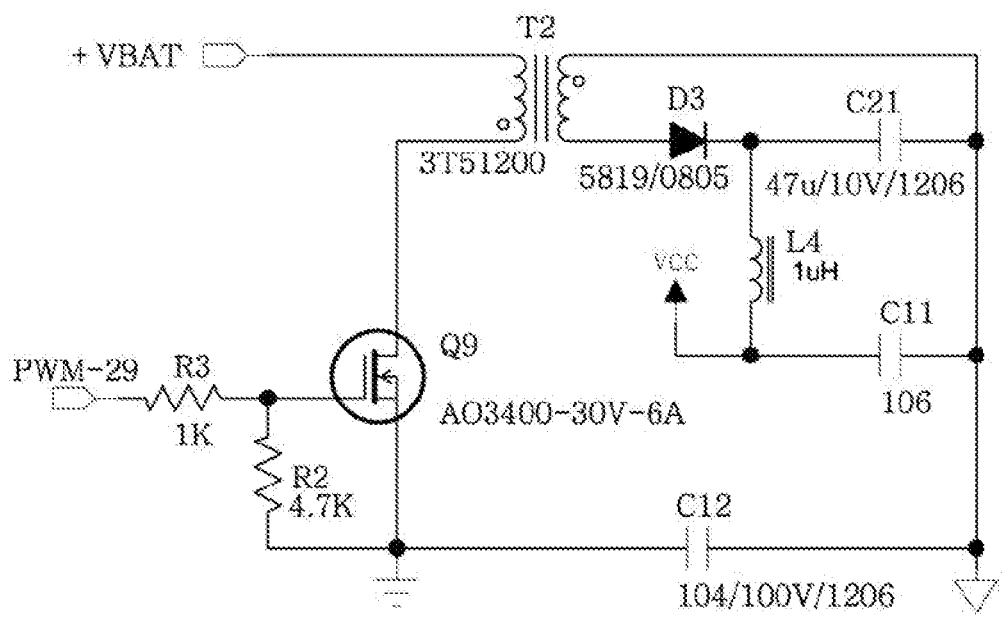
FIG. 2 is a circuit diagram of a boost circuit and a power rectifying and filtering circuit of the intelligent temperature adjustment control circuit of FIG. 1.
Figure 3:
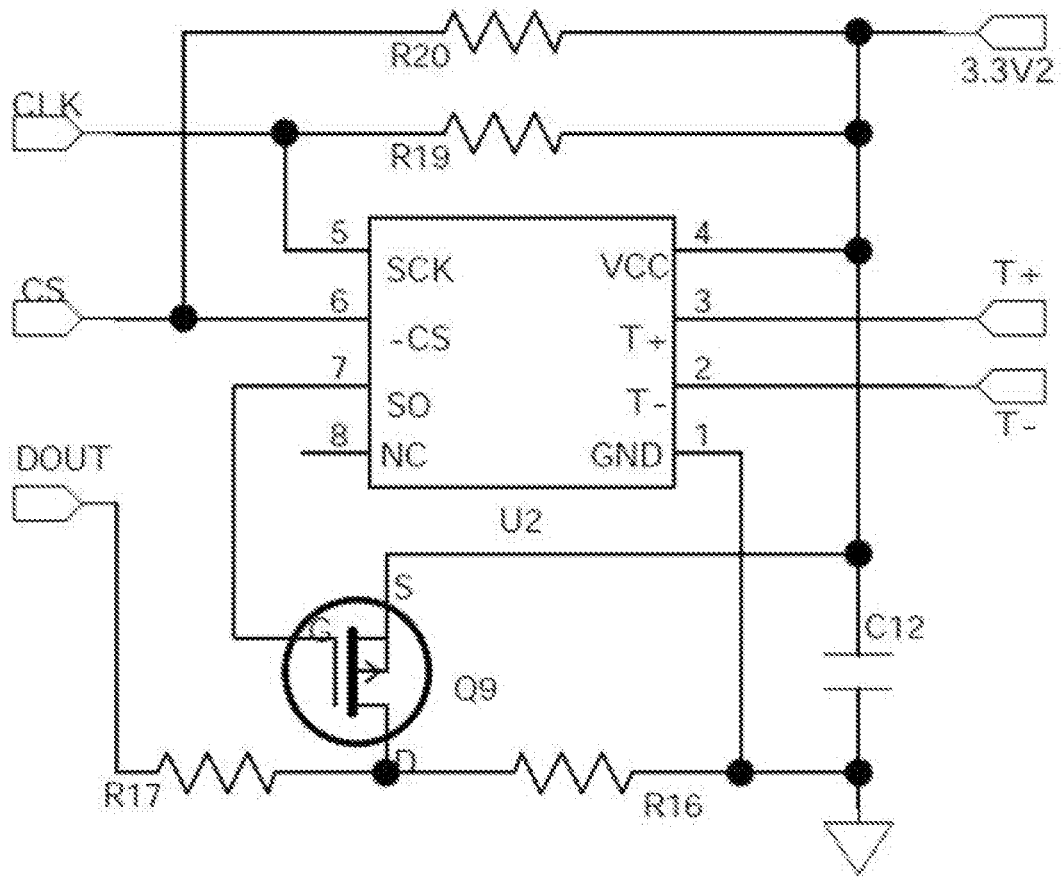
FIG. 3 is a circuit diagram of a thermocouple sensor and an analog-to-digital converter of the intelligent temperature adjustment control circuit of FIG. 1.
Figure 4:
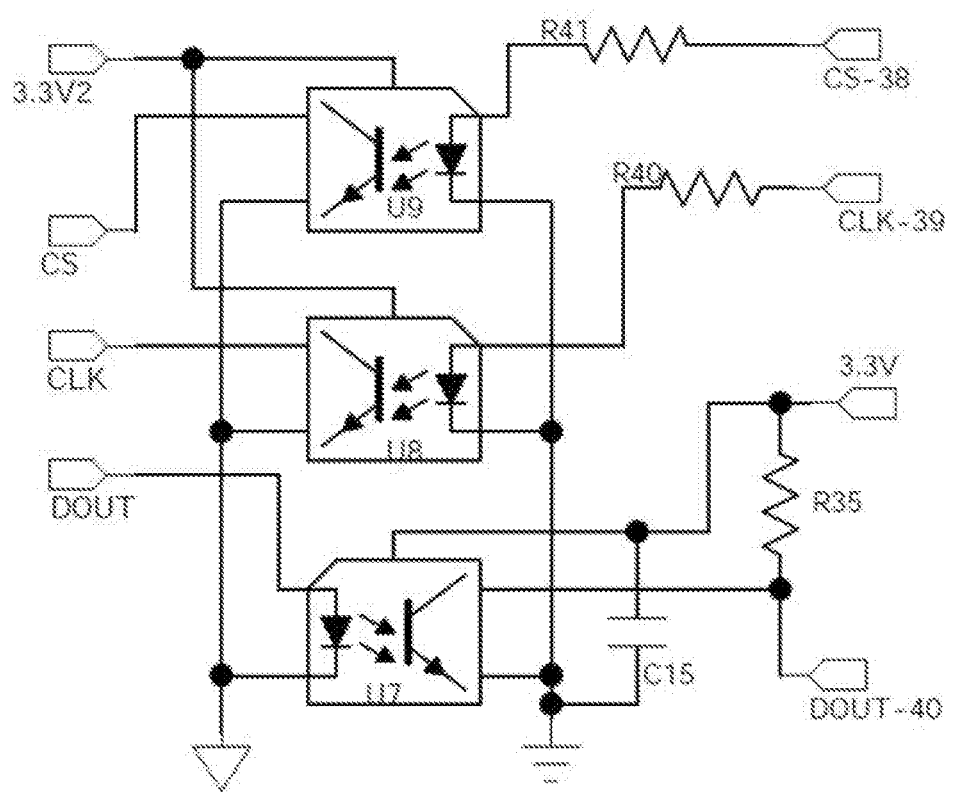
FIG. 4 is circuit diagram of a signal isolation driving circuit of the intelligent temperature adjustment control circuit of FIG. 1.
Figure 5:
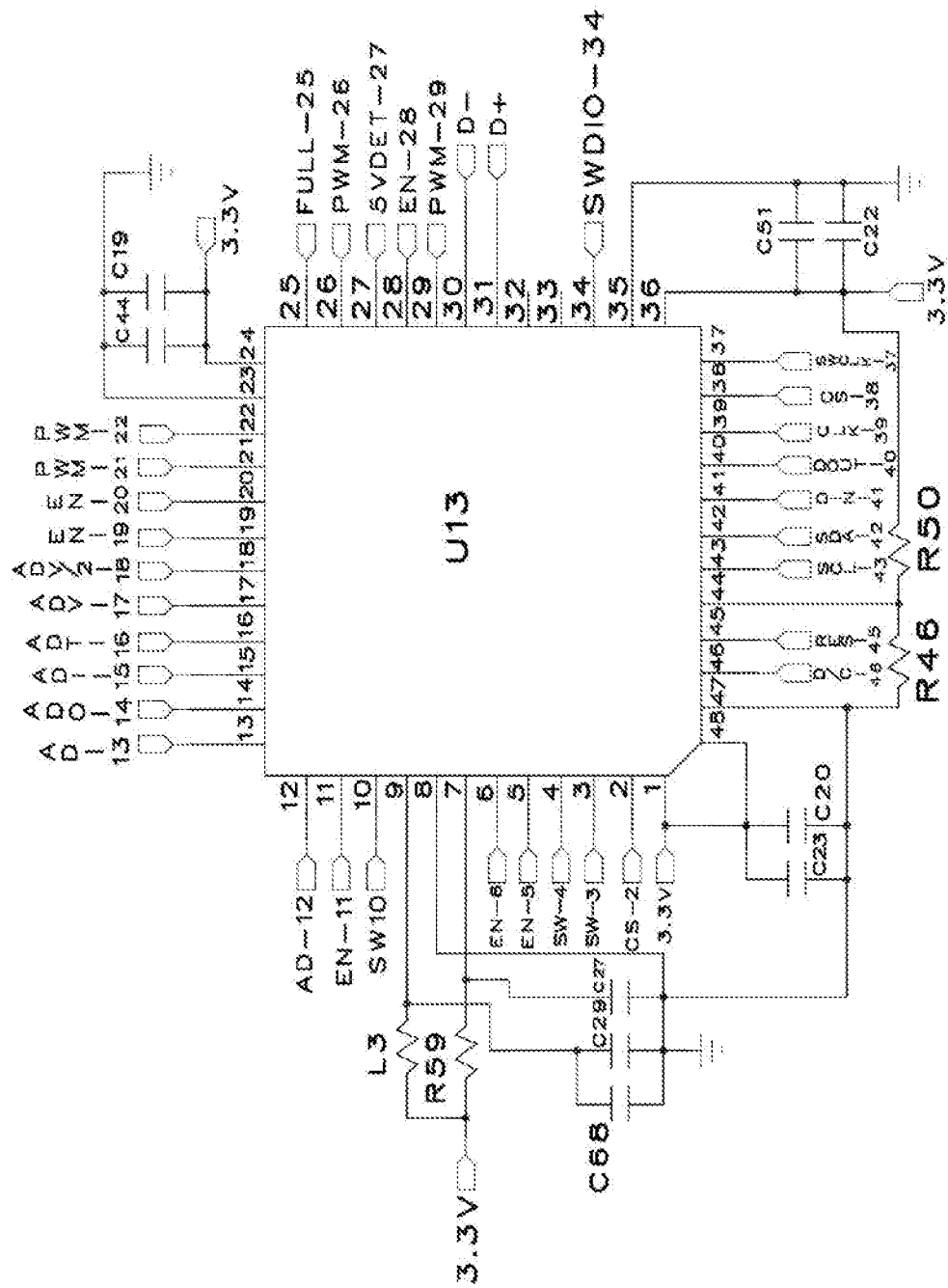
FIG. 5 is a circuit diagram of a main control unit of the intelligent temperature adjustment control circuit of FIG. 1.

The disclosure is illustrated by way of example and not by way of limitation in the figures of the accompanying drawings, in which like reference numerals indicate similar elements.

Referring to FIGS. 1-5, the intelligent temperature adjustment control circuit of an electronic cigarette in accordance with an exemplary embodiment includes a first resistance sampling circuit 1, a second resistance sampling circuit 2, a current sampling circuit 4, a voltage sampling circuit 3 and a thermocouple sensor 13, respectively connected to a heating wire 10 of an atomizer used on the electronic cigarette. The intelligent temperature adjustment control circuit further includes a main control unit 5, a main driving circuit 8, a power adjusting unit 9, an analog-to-digital converter 15 and a signal isolation driving circuit 17.

The first resistance sampling circuit 1 is configured to collect an initial resistance value of the heating wire 10.

The second resistance sampling circuit 2 is configured to collect a real-time resistance value of the heating wire 10 in a heated state.

The current sampling circuit 4 is configured to collect a real-time current value passing through the heating wire 10 in the heated state.

The voltage sampling circuit 3 is configured to collect real-time voltage value passing through the heating wire 10 in the heated state.

The thermocouple sensor 13 is configured to collect real-time temperature data of the heating wire 10 in the heated state and convert it to a corresponding voltage signal value. In this way it is more accurate and reliable relative to the method that estimates the temperature by using the resistance change rate of the heating wire before and after. The thermocouple sensor 13 is installed in the atomizer and includes a pair of electrodes T+, T. The pair of electrodes T+, T is respectively connected to a pair of pins PIN2, PIN3 of a control chip U2 set in the analog-t-digital converter 15 can convert the temperature value to a digital signal through analog to digital conversion and then output the digital signal via the pins PIN5, PIN6 and PIN7 of the control chip U2.

The analog-to-digital converter 15 is connected to the thermocouple sensor 13 and configured to convert the voltage signal value to a voltage digital signal.

The signal isolation driving circuit 17 is connected to the analog-to-digital converter 15 and comprising at least one optocoupler U7, U8, U9 (seen in FIG. 4) for transmitting the voltage digital signal to the main control unit 5 via a photoelectric coupling transmission way. The signal isolation driving circuit 17 is configured to transmit the voltage digital signal through an op coupler isolation way, which can effectively solve the problem of mutual interference in the process of signal transmission. Three digital signals CS, CLK, DOUT output from the control chip U2 are respectively transmitted to their corresponding signals CS-38, CLK-39, DOUT-40 of the main control unit 5 via their respective optocouplers U9, U8, U7 of the signal isolation driving circuit 17, and then input into the corresponding pins PIN38, PIN39, PIN40 of a control chip U13 to cooperatively form as a temperature signal sampling circuit.

The main control unit 5 is connected to each of the first resistance sampling unit 1, the second resistance sampling unit 2, the current sampling circuit 4, the voltage sampling circuit 3 and the signal isolation driving circuit 17. The main control unit 5 is configured to determine the received initial resistance value, the real-time resistance value, the real-time current value, the real-time voltage value and the voltage digital signal, and then send a control signal to the main driving circuit 8 according to a judgment result of the received initial resistance value, the real-time resistance value, the real-time current value, the real-time voltage value and the voltage digital signal, that have been determined. The main control unit 5 is further configured to calculate the resistance rate of the heating wire 10 as a workload with the change of temperature via the received initial resistance value, the real-time resistance value, the real-time current value and the real-time voltage value, so as to set an approximate temperature control range of an actual work of the heating wire 10 and then serve it as the basis of reference calculation for an advance quantity of temperature settings. Furthermore, the real-time temperature data collected by the thermocouple sensor 13 is processed by the signal isolation driving circuit 17 and then sent to the main control unit 5, which is matched with the calculated advance quantity of the temperature settings, to control the heating quantity of the heating wire 10 in the atomizer for improving control accuracy more accurately.

The main driving circuit 8 is connected to the main control unit 5 and configured to drive the power adjusting unit 9 according to the received control signal.

The power adjusting unit 9 is connected to both the main driving circuit 8 and the heating wire 10, and configured to adjust an operating power of the heating wire 10 according to a driving signal transmitted from the main driving circuit 8.

Furthermore, the intelligent temperature adjustment control circuit further includes a power management circuit 12 and a battery 18 connected to each of the power management circuit 12, the main control unit 5 and the power adjusting unit 9. The power management circuit 12 is connected to a boost circuit 14 and applying a working voltage for the boost circuit 14.

The boost circuit 14 is connected to the main control unit 5 and can adjust its operating state according to the control signal of the main control unit 5, and also connected to a power rectifying and filtering circuit 16 via a transformer T2 for outputting the working voltage after being boosted to the power rectifying and filtering circuit 16.

The power rectifying and filtering circuit 16 is connected to the analog-to-digital converter 15 and the signal isolation driving circuit 17, respectively. The power rectifying and filtering circuit 16 is configured to rectify and filter the boosted working voltage and then transmit it to the analog-to-digital converter 15 and the signal isolation driving circuit 17.

The boost circuit 14 and the power rectifying and filtering circuit 16 of the present disclosure are cooperating to form as an isolation power supply for supplying power for the analog-to-digital converter 15 and the signal isolation driving circuit 17. An input PWM-29 of the boost circuit 14 is connected to a PWM pin of the main control unit 5 to generate a set of AC voltage at the secondary of the transformer T2 and then the AC voltage is half-wave rectified by a diode D3 and further filtered by a capacitor C21, an inductor L4 and a capacitor C11, finally it is output a constant voltage VCC to provide power supply for the analog-to-digital converter 15 and the signal isolation driving circuit 17. At the same time, two ends of the capacitor C12 are respectively connected to different ground wires to be completely separated. In this way, the power supply of the thermocouple temperature sampling branch and the temperature data communication section are effectively isolated from the main circuit of the host so that the influence of external interference on the temperature data can be removed completely.

Figure 6:
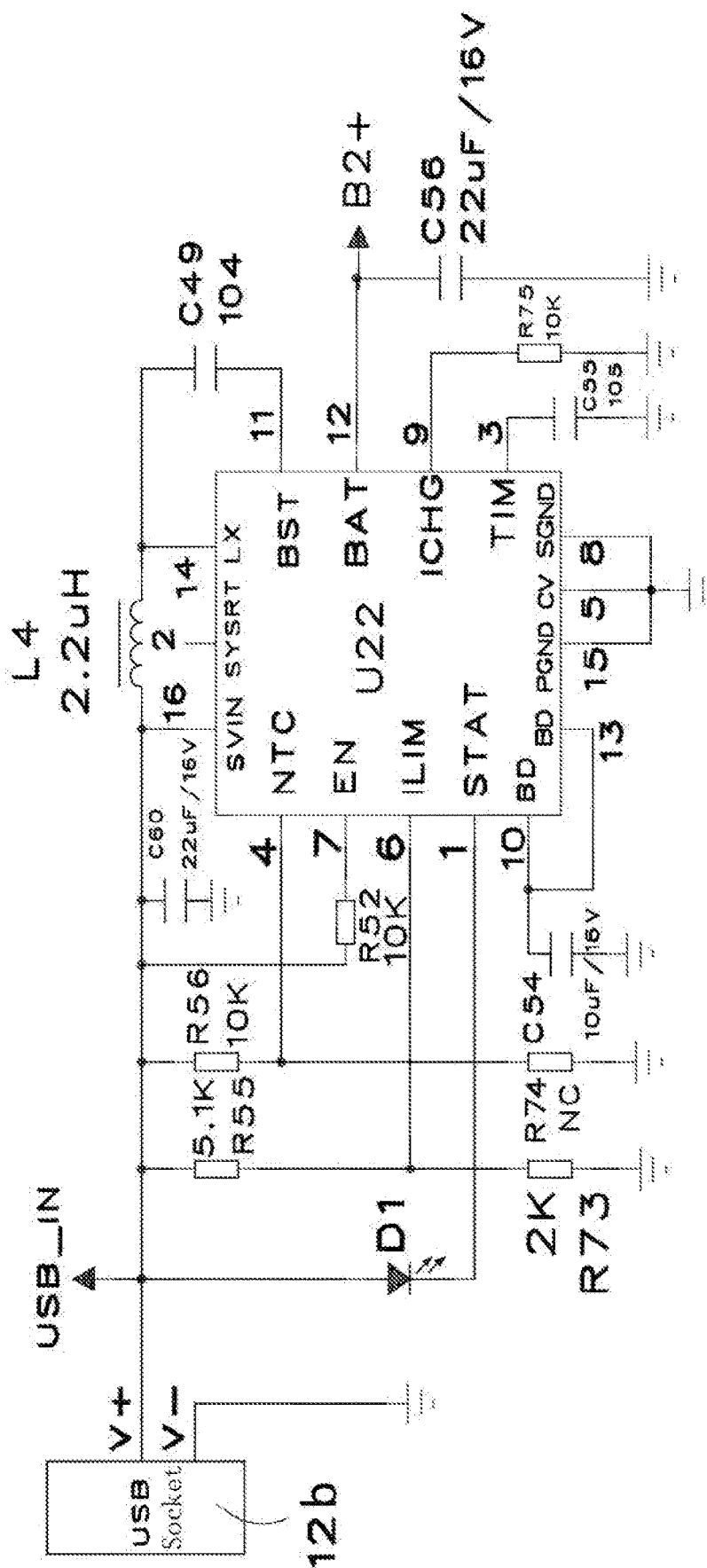
FIG. 6 is a circuit diagram of a charging circuit of FIG. 1.

Furthermore, the battery 18 is further connected to an anti-reverse protecting circuit 11 and the power management circuit 12 includes a charging circuit 12*a* with a USB socket 12*b* (referring to FIG. 6) formed therein.

Furthermore, the main control unit 5 is connected to both a controlling switch 6 and a displaying screen 7. In the exemplary embodiment of the present disclosure, the displaying screen 7 is an OLED displaying screen. The main control unit 5 is configured to output the control signal to the OLED displaying screen via its port I2C so that some relevant electrical characteristic parameters of the atomizer, such as voltage, current, resistance, power, temperature rise and other parameters, as well as auxiliary display related setting parameters, can be displayed on the OLED displaying screen. In this way, it is convenient for user to intuitively understand the working state and setup parameters of the product. If the main control unit 5 does not get a next switching command, it will go to a sleep state and the OLED displaying screen will also be closed.

The structure of the present disclosure can first solve the problem that the electronic cigarette can't be double-path temperature sampling and make up for the deficiency of single-path temperature sampling of the conventional electronic cigarette, and second solve the problem of multiple isolation measures of the circuits used on the electronic cigarette to ensure the validity of temperature sampling data. Finally, the present disclosure can also solve the problem of preventing burning by the highest temperature limiting measure of the electronic cigarette to improve the lifespan of the atomizing core.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An intelligent temperature adjustment control circuit of an electronic cigarette comprising:
    a first resistance sampling circuit connected to a heating wire of, an atomizer used on the electronic cigarette and configured to collect an initial resistance value of the heating wire;
    a second resistance sampling circuit connected to the heating wire of the atomizer and configured to collect a real-time resistance value of the heating wire in a heated state;
    a current sampling circuit connected to the heating wire of the atomizer and configured to collect a real-time current value passing through the heating wire in the heated state;
    a voltage sampling circuit connected to the heating wire of the atomizer and configured to collect a real-time voltage value passing through the heating wire in the heated state;
    a thermocouple sensor connected to the heating wire of the atomizer and configured to collect real-time temperature data of the heating wire in the heated state and convert it to a corresponding voltage signal value;
    an analog-to-digital converter connected to the thermocouple sensor and configured to convert the voltage signal value to a voltage digital signal;
    a signal isolation driving circuit connected to the analog-to-digital converter and comprising at least one optocoupler for transmitting the voltage digital signal to a main control unit via a photoelectric coupling transmission way;
    the main control unit connected to each of the first resistance sampling unit, the second resistance sampling unit, the current sampling circuit, the voltage sampling circuit and the signal isolation driving circuit, and configured to determine the received initial resistance value, the real-time resistance value, the real-time current value, the real-time voltage value and the voltage digital signal, and then send a control signal to a main driving circuit according to a judgment result of the received initial resistance value, the real-time resistance value, the real-time current value, the real-time voltage value and the voltage digital signal, that have been determined;
    the main driving circuit connected to the main control unit and configured to drive a power adjusting unit according to the received control signal; and
    the power adjusting unit connected to the main driving circuit and the heating wire, respectively and configured to adjust an operating power of the heating wire according to a driving signal transmitted from the main driving circuit.

2. The intelligent temperature adjustment control circuit as claimed in claim 1, wherein the intelligent temperature adjustment control circuit further comprises a power management circuit and a battery connected to each of the power management circuit, the main control unit and the power adjusting unit; the power management circuit connected to a boost circuit and applying a working voltage for the boost circuit;
    the boost circuit connected to the main control unit and adjusting its operating state according to the control signal of the main control unit, and also connected to a power rectifying and filtering circuit via a transformer for outputting the working voltage after being boosted to the power rectifying and filtering circuit; and
    the power rectifying and filtering circuit connected to the analog-to-digital converter and the signal isolation driving circuit respectively and configured to rectify and filter the boosted working voltage and then transmit it to the analog-to-digital converter and the signal isolation driving circuit.

3. The intelligent temperature adjustment control circuit as claimed in claim 2, wherein the battery is further connected to an anti-reverse protecting circuit and the power management circuit comprises a charging circuit with a USB socket formed therein.

4. The intelligent temperature adjustment control circuit as claimed in claim 3, wherein the main control unit is connected to both a controlling switch and a displaying screen.

* * * * *